United States Patent
Larson et al.

(10) Patent No.: US 12,344,219 B2
(45) Date of Patent: Jul. 1, 2025

(54) BRAKE ACTUATOR CONTROL SYSTEMS AND METHODS

(71) Applicant: GM GLOBAL TECHNOLOGY OPERATIONS LLC, Detroit, MI (US)

(72) Inventors: Bryan Larson, Fowlerville, MI (US); Nicholas Reilly Ridenour, Davisburg, MI (US); Samuel Steele, Ypsilanti, MI (US); Edward Thomas Heil, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 181 days.

(21) Appl. No.: 18/333,722

(22) Filed: Jun. 13, 2023

(65) Prior Publication Data
US 2024/0416878 A1  Dec. 19, 2024

(51) Int. Cl.
*B60T 8/18* (2006.01)

(52) U.S. Cl.
CPC .................. *B60T 8/1887* (2013.01)

(58) Field of Classification Search
CPC .............................. B60T 8/1887; B60T 8/18
See application file for complete search history.

(56) References Cited

U.S. PATENT DOCUMENTS

2020/0347895 A1\* 11/2020 Kleefisch ............... B60T 8/171

\* cited by examiner

*Primary Examiner* — Lindsay M Low
*Assistant Examiner* — Charles J Brauch (57) ABSTRACT

A brake actuator control system for a vehicle includes: a request module configured to determine a braking request for brake actuators of the vehicle; a front bias module configured to, based on one or more operating parameters, determine a front bias for front ones of the brake actuators associated with front ones of wheels, respectively; a rear bias module configured to, based on the front bias, determine a rear bias for rear ones of the brake actuators associated with rear ones of wheels, respectively; a control module configured to: based on the braking request and the front bias, determine a front braking request; actuate the front ones of the brake actuators based on the front braking request; based on the braking request and the rear bias, determine a rear braking request; and actuate the rear ones of the brake actuators based on the rear braking request.

20 Claims, 4 Drawing Sheets

BRAKE ACTUATOR CONTROL SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to brake systems of vehicles and more particularly to systems and methods for controlling brake actuators of vehicles.

Vehicles include one or more torque producing devices, such as an internal combustion engine and/or an electric motor. The torque producing device(s) are used to output torque for propulsion of the vehicle.

Passengers of a vehicle ride within a passenger cabin (or passenger compartment) of the vehicle. A driver actuates an accelerator pedal to input a request for acceleration of the vehicle. The driver actuates a brake pedal of the vehicle to input a request for deceleration of the vehicle. The driver turns a steering wheel to turn or steer or to input a request to turn or steer the vehicle left or right.

A brake system of the vehicle applies friction brakes to rotors, respectively, to slow wheels of the vehicle in response to actuation of the brake pedal.

SUMMARY

In a feature, a brake actuator control system for a vehicle includes: a request module configured to determine a braking request for brake actuators of the vehicle, the brake actuators configured to, independently of each other, slow rotation of wheels, respectively, of the vehicle; a front bias module configured to, based on one or more operating parameters, determine a front bias for front ones of the brake actuators associated with front ones of wheels, respectively; a rear bias module configured to, based on the front bias, determine a rear bias for rear ones of the brake actuators associated with rear ones of wheels, respectively; a control module configured to: based on the braking request and the front bias, determine a front braking request for the front ones of the brake actuators; actuate the front ones of the brake actuators based on the front braking request; based on the braking request and the rear bias, determine a rear braking request for the rear ones of the brake actuators; and actuate the rear ones of the brake actuators based on the rear braking request.

In further features, the one or more operating parameters includes a brake rotor temperature.

In further features, the one or more operating parameters includes a parameter of an electric propulsion motor of the vehicle.

In further features, the parameter is a temperature of the electric propulsion motor.

In further features, the one or more operating parameters includes a mode of operation of the vehicle.

In further features, the one or more operating parameters includes a propulsion torque of the vehicle.

In further features, the one or more operating parameters includes a brake actuator capability.

In further features, the rear bias module is configured to set the rear bias based on 100 minus the front bias.

In further features, the control module is configured to: apply power to first electric motors of the front ones of the brake actuators based on the front braking request; and apply power to second electric motors of the rear ones of the brake actuators based on the rear braking request.

In further features: a distribution module is configured to determine a front percent based on a front static mass of the vehicle, where the front bias module is configured to determine the front bias based on the front static mass and the one or more operating parameters.

In further features, the distribution module is configured to determine the front percent using one of a lookup table and an equation that relates front static masses to front percents.

In further features, a static mass module is configured to determine the front static mass based on the braking request.

In further features, the static mass module is configured to determine the front static mass further based on a vehicle loading parameter.

In further features, the vehicle loading parameter is an indicator of whether the vehicle is towing a trailer.

In further features, the vehicle loading parameter is a present load of the vehicle.

In further features, the vehicle loading parameter is a mass distribution of the vehicle.

In further features, the static mass module is configured to determine the front static mass using one of a lookup table and an equation that relates vehicle loading parameters and braking requests to front static masses.

In further features, the control module is configured to set the front braking request based on the braking request multiplied by the front bias.

In further features, the control module is configured to set the rear braking request based on the braking request multiplied by the rear bias.

In a feature, a brake actuator control method for a vehicle includes: determining a braking request for brake actuators of the vehicle, the brake actuators configured to, independently of each other, slow rotation of wheels, respectively, of the vehicle; based on one or more operating parameters, determining a front bias for front ones of the brake actuators associated with front ones of wheels, respectively; determining a rear bias for rear ones of the brake actuators associated with rear ones of wheels, respectively; based on the braking request and the front bias, determining a front braking request for the front ones of the brake actuators; actuating the front ones of the brake actuators based on the front braking request; based on the braking request and the rear bias, determining a rear braking request for the rear ones of the brake actuators; and actuating the rear ones of the brake actuators based on the rear braking request.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Boosted brake systems of vehicles may include a brake booster that provides hydraulic fluid to calipers of wheels, respectively, of the vehicle. The present application involves individual/independent pressure/force generating brake actuators for the wheels, respectively. Each brake actuator applies pressure to a rotor of its wheel independently of the other brake actuators.

The present application involves dynamically determining bias to apply to front brake actuators and to rear brake actuators based on vehicle state and other operating parameters. The dynamic proportioning of the bias of braking between the front and rear wheels increases vehicle stability performance and increases vehicle braking performance.

Figure 1:
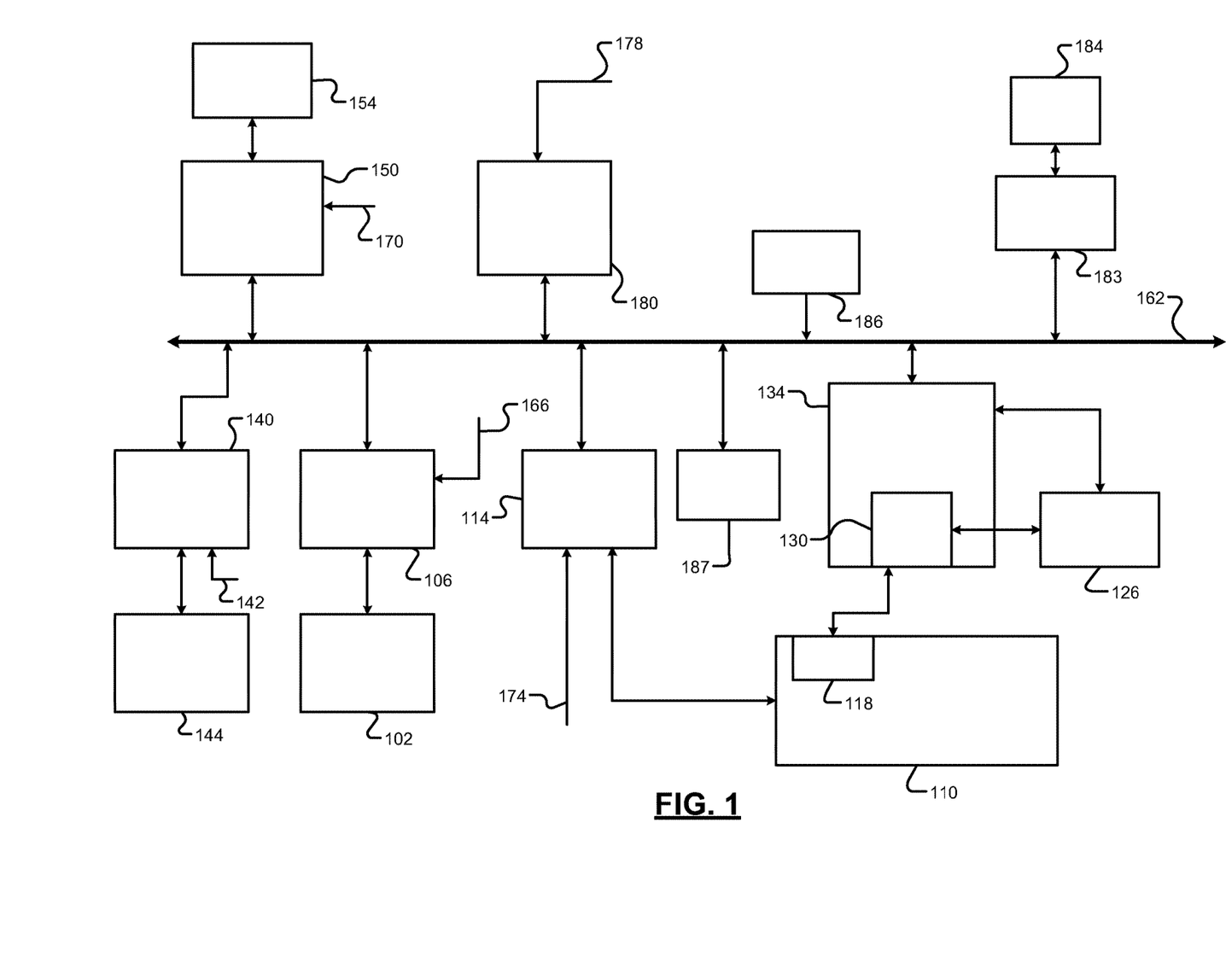
FIG. 1 is a functional block diagram of an example vehicle system.

Referring now to FIG. 1, a functional block diagram of an example vehicle system is presented. While a vehicle system for a hybrid vehicle is shown and will be described, the present application is also applicable to non-hybrid vehicles, electric vehicles, fuel cell vehicles, and other types of vehicles. The present application is applicable to autonomous vehicles, semi-autonomous vehicles, non-autonomous vehicles, shared vehicles, non-shared vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter module (PIM) 134 may control the electric motor 118 and the PCD 130. The PCD 130 applies power from the battery 126 to the electric motor 118 based on signals from the PIM 134, and the PCD 130 provides power output by the electric motor 118, for example, to the battery 126. The PIM 134 may include, for example, an inverter.

A steering control module 140 controls steering/turning of wheels of the vehicle, for example, based on driver turning of a steering wheel within the vehicle and/or steering commands from one or more vehicle control modules. A steering wheel angle (SWA) sensor (not shown) monitors rotational position of the steering wheel and generates a SWA 142 based on the position of the steering wheel. As an example, the steering control module 140 may control vehicle steering via an electronic power steering (EPS) motor 144 based on the SWA 142. However, the vehicle may include another type of steering system.

A brake control module 150 may control actuation of brake actuators 154 (brake actuator modules) of the vehicle based on one or more driver inputs, such as a brake pedal position (BPP) 170. The brake actuators 154 control application of friction brakes at the wheels, respectively, of the vehicle. The brake actuators 154 apply respective friction brakes independently of each other.

Modules of the vehicle may share parameters via a network 162, such as a controller area network (CAN). A CAN may also be referred to as a car area network. For example, the network 162 may include one or more data buses. Various parameters may be made available by a given module to other modules via the network 162.

The driver inputs may include, for example, an accelerator pedal position (APP) 166 which may be provided to the ECM 106. The BPP 170 may be provided to the brake control module 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

An infotainment module 183 may output various information via one or more output devices 184. The output devices 184 may include, for example, one or more displays (non-touch screen and/or touch screen), one or more other suitable types of video output devices, one or more speakers, one or more haptic devices, and/or one or more other suitable types of output devices.

The infotainment module 183 may output video via the one or more displays. The infotainment module 183 may output audio via the one or more speakers. The infotainment module 183 may output other feedback via one or more haptic devices. For example, haptic devices may be included with one or more seats, in one or more seat belts, in the steering wheel, etc. Examples of displays may include, for example, one or more displays (e.g., on a front console) of the vehicle, a head up display (HUD) that displays information via a substrate (e.g., windshield), one or more displays that drop downwardly or extend upwardly to form panoramic views, and/or one or more other suitable displays.

The vehicle may include a plurality of external sensors and cameras, generally illustrated in FIG. 1 by 186. One or more actions may be taken based on input from the external sensors and cameras 186. For example, the infotainment module 183 may display video, various views, and/or alerts on a display via input from the external sensors and cameras 186 during driving.

The vehicle may include one or more additional control modules that are not shown, such as a chassis control module, a battery pack control module, etc. The vehicle may omit one or more of the control modules shown and discussed.

Figure 2:
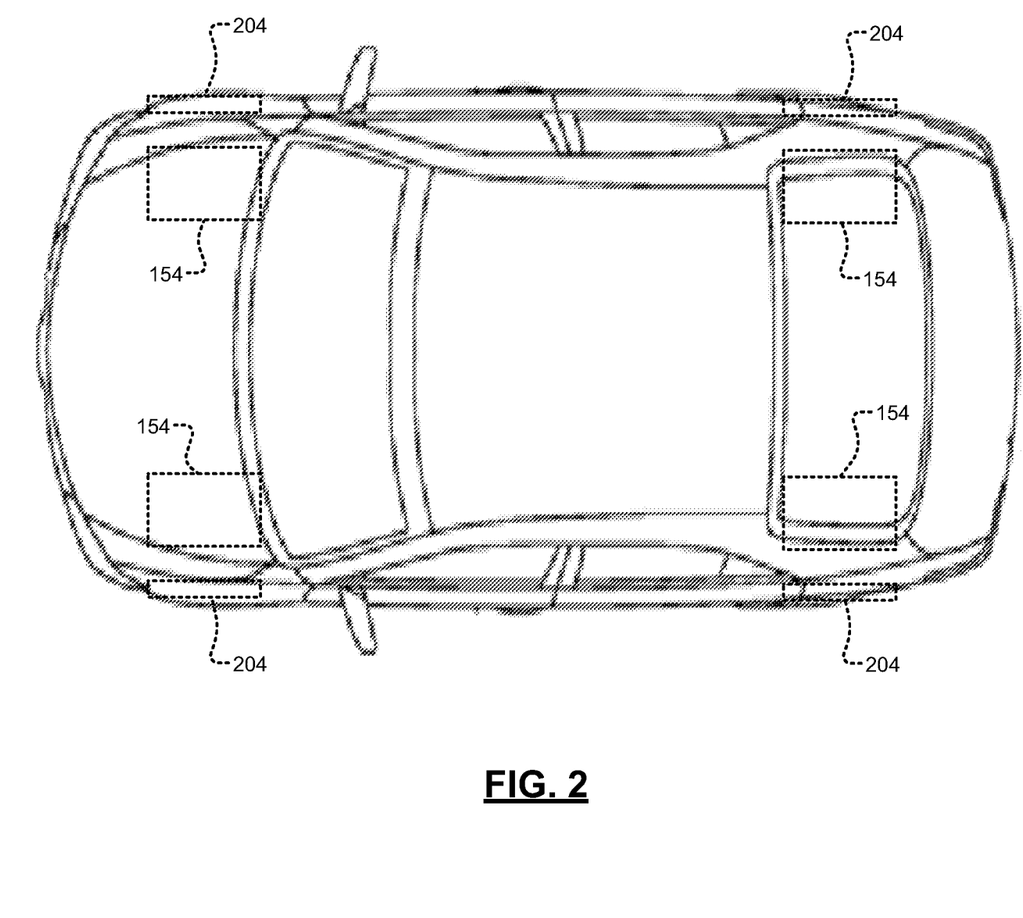
FIG. 2 is a top view of an example vehicle including brake actuators.

FIG. 2 is a top view of an example vehicle and illustrates examples of wheels 204 and the brake actuators 154, respectively. The brake actuators 154 are configured to apply friction brakes and slow rotation of the wheels 204, respectively. One brake actuator 154 is provided per wheel. The brake actuators 154 may be, for example, electromechanical or electro-hydraulic brake actuators and each include an independent pressure/force generation device that applies one or more brake pads to a rotor of that respective wheel.

Figure 3:
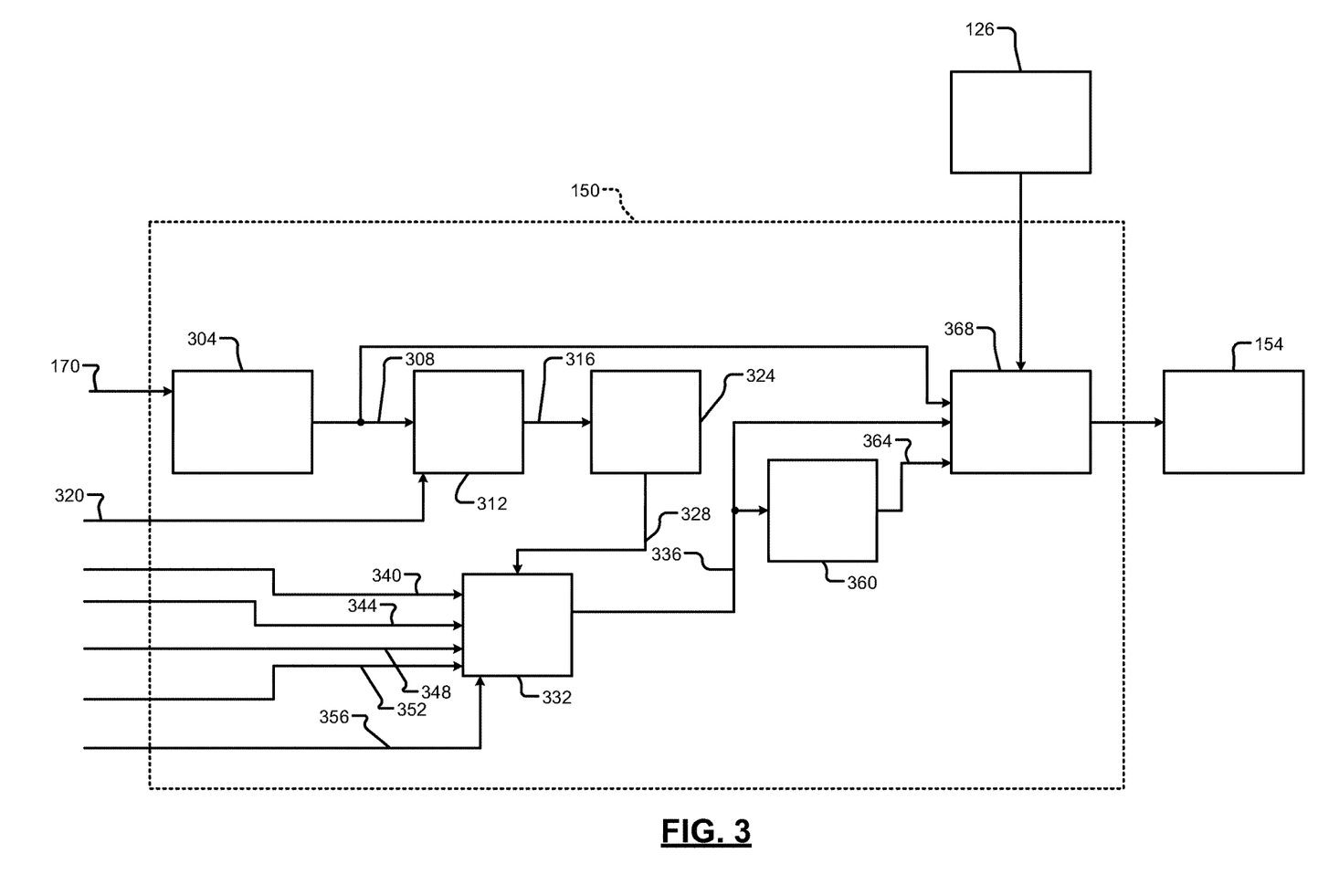
FIG. 3 is a functional block diagram of an example implementation of a brake control module.

FIG. 3 is a functional block diagram of an example implementation of the brake control module 150. A request module 304 determines a braking request 308, such as based on the BPP 170 and/or one or more other parameters. Examples of other parameters include autonomous driving requests, emergency braking requests, and other parameters. The request module 308 may determine the braking request 308, for example, using a lookup table or an equation that relates BPPs to braking requests. The request module 308 may increase the braking request as the BPP increases and vice versa.

A static mass module 312 determines a static front mass 316 of the vehicle based on the braking request 308 and one or more vehicle loading parameters 320. When the brakes are applied, more force is applied to front wheels of the vehicle as the vehicle slows. The static font mass 316 may correspond to a normal (downward) force on the front wheels of the vehicle. Examples of the vehicle loading parameters 320 include an indicator of whether the vehicle is towing a trailer, a present load of the vehicle, a mass distribution of the vehicle, and/or one or more other vehicle loading parameters. The present load and/or the mass distribution may be determined, for example, based on measured ride heights of the vehicle or determined in another suitable manner. The static mass module 312 may determine the static front mass 316, for example, using a lookup table that relates vehicle loading conditions and brake requests to static front masses.

A distribution module 324 determines a front brake percentage 328 (percent front request) based on the static front mass 316. The front brake percentage 328 may dictate the distribution between braking performed by the brake actuators of the front wheels and the braking performed by the brake actuators of the rear wheels. The distribution module 324 may determine the front brake percentage 328 using an equation or a lookup table that relates static front masses to front brake percentages. The distribution module 324 may, for example, decrease the front brake percentage as the static front mass increases and vice versa. The front brake percentage 328 may be, for example, a percentage between 0 and 100 percent, inclusive.

A front bias module 332 determines a front bias percent 336 based on the front brake percentage 328 and one or more present operating parameters. The front bias module 332 may determine the front bias percent 336, for example, using one or more equations and/or lookup table that relate front brake percentages and operating parameters to front bias percentages. Examples of the operating parameters include a present mode 340 (e.g., towing, offroad, sport, eco, normal, etc.), a brake actuator capability 344, e.g., one or more motor parameters 348 of the electric motor(s) 118, one or more brake rotor temperatures 352, a present propulsion torque 356, and one or more other parameters. The brake bias between front and rear braking can be set based on the mode 340, for example, to optimize torque distribution for the present mode 340. The rotor temperatures 352 can be used to shift braking to the front or rear wheels such as to maintain the rotor temperatures 352 within a predetermined temperature range. Based on the propulsion torque 356, for example, if negative motor torque is limited on a front or rear axle, braking can be distributed for example to maximize tire adhesion. The motor parameters 348 may include, for example, temperature(s) of the electric motor(s) 118, whether regeneration is being performed, whether torque output is limited, and/or one or more other parameters. Based on the brake actuator capability 344, braking can be shifted to the front or rear wheels, such as based on optimizing vehicle stability and brake actuator loads. The front bias percent 336 may be, for example, a percentage between 0 and 100 percent, inclusive.

A rear bias module 360 determines a rear bias percent 364 based on the front bias percent 336 using, for example, a lookup table or an equation. For example, the rear bias module 360 may set the rear bias percent 364 based on or equal to 100 minus the front bias percent 336. The rear bias percent 364 may be, for example, a percentage between 0 and 100 percent, inclusive.

A power control module 368 applies power to the electric motors of the brake actuators 154 of the front wheels based on the braking request 308 (e.g., a force) and the front bias percent 336. The power control module 368 applies power to the electric motors of the brake actuators 154 of the rear wheels based on the braking request 308 and the rear bias percent 364.

For example, the power control module 368 may determine a front braking request (e.g., a force) based on the braking request 308 and the front bias percent 336. The power control module 368 may determine the front braking request, for example, using a lookup table or an equation that relates braking requests and front bias percents to front braking requests. For example, the power control module 368 may set the front braking request based on or equal to the braking request multiplied by the front bias percent 336 (e.g., as a value between 0.0 and 1.0 corresponding to the percentage). The power control module 368 may apply power to the electric motors of the brake actuators 154 of the front wheels based on achieving the front braking request.

The power control module 368 may determine a rear braking request (e.g., a force) based on the braking request 308 and the rear bias percent 364. The power control module 368 may determine the rear braking request, for example, using a lookup table or an equation that relates braking requests and rear bias percents to front braking requests. For example, the power control module 368 may set the rear braking request based on or equal to the braking request 308 multiplied by the rear bias percent 364 (e.g., as a value between 0.0 and 1.0 corresponding to the percentage). The power control module 368 may apply power to the electric motors of the brake actuators 154 of the rear wheels based on achieving the rear braking request.

The power control module 368 may apply power from the battery 126 to the electric motors of the brake actuators 154. In various implementations, the power control module 368 may convert direct current (DC) power from the battery 126 into alternating current (AC) power and apply AC power to the electric motors. While an example implementation is shown, the power control module 368 (and/or one or more other modules) may be implemented differently. For example, the power control module 368 may be implemented within the brake control module or in the brake actuators 154.

Figure 4:
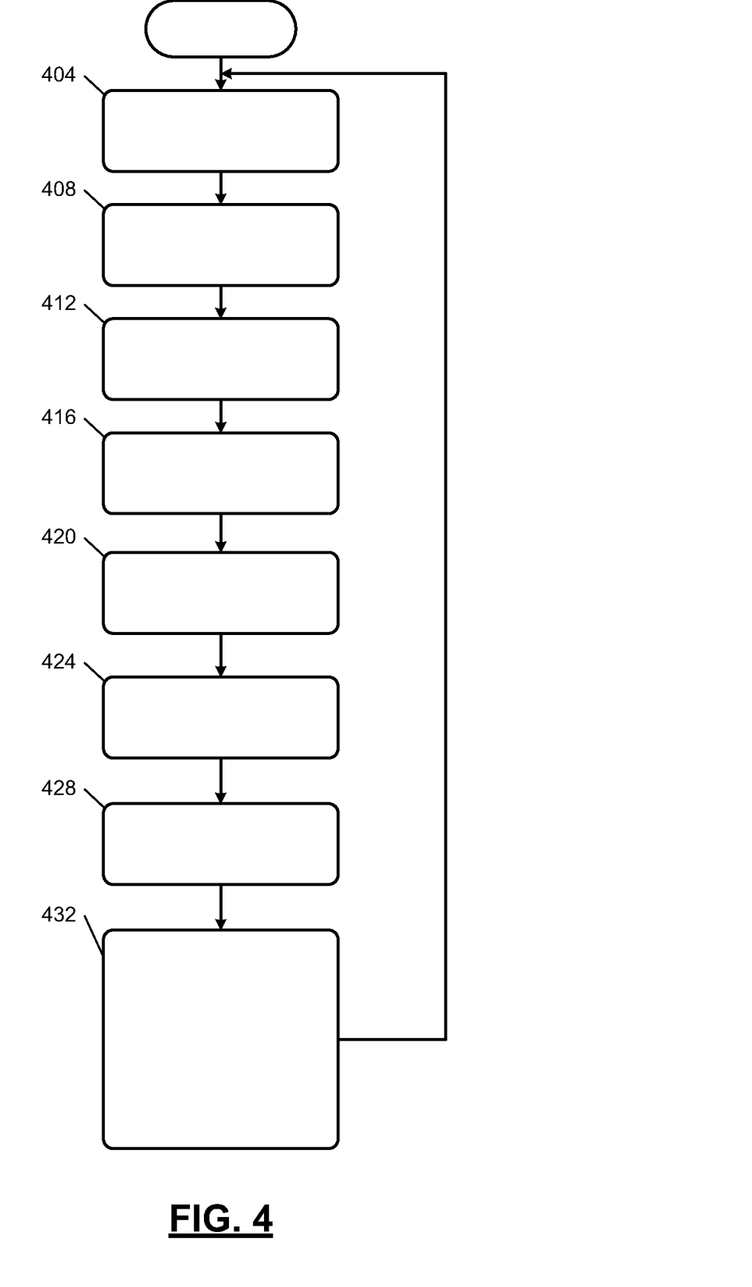
FIG. 4 is a flowchart depicting an example method of controlling the brake actuators.

FIG. 4 is a flowchart depicting an example method of controlling the brake actuators 154. Control begins with 404 where the request module 304 determines the braking request 308, such as based on the BPP 170. At 408, the static mass module 316 determines the front static mass 316 based on the braking request 308 and the vehicle loading parameters 320.

At 412, the distribution module 324 determines the front brake percentage 328 based on the front static mass 316. At 416, the front bias module 332 determines the front bias module 332 determines the front bias percent 336 as discussed above.

At 420, the rear bias module 360 determines the rear bias percent 364 based on the front bias percent 336. At 424, the power control module 368 may determine the front braking request based on the braking request 308 and the front bias percent 336. At 428, the power control module 368 may determine the rear braking request based on the braking request 308 and the rear bias percent 364. At 432, the power control module 368 applies power to and actuates the brake actuators 154 of the front wheels to achieve the front braking request. Also, the power control module 368 applies power to and actuates the brake actuators 154 of the rear wheels to achieve the rear braking request. Control returns to 404. One loop of FIG. 4 may be performed or started each predetermined period.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A brake actuator control system for a vehicle, comprising:
   a request module configured to determine a braking request for brake actuators of the vehicle,
   the brake actuators configured to, independently of each other, slow rotation of wheels, respectively, of the vehicle;
   a front bias module configured to, based on one or more operating parameters, determine a front bias for front ones of the brake actuators associated with front ones of wheels, respectively;
   a rear bias module configured to, based on the front bias, determine a rear bias for rear ones of the brake actuators associated with rear ones of wheels, respectively;
   a control module configured to:
     based on the braking request and the front bias, determine a front braking request for the front ones of the brake actuators;
     actuate the front ones of the brake actuators based on the front braking request;
     based on the braking request and the rear bias, determine a rear braking request for the rear ones of the brake actuators; and
     actuate the rear ones of the brake actuators based on the rear braking request; and
   a distribution module configured to determine a front percent based on a front static mass of the vehicle,
   wherein the front bias module is configured to determine the front bias based on the front static mass and the one or more operating parameters.

2. The brake actuator control system of claim 1 wherein the one or more operating parameters includes a brake rotor temperature.

3. The brake actuator control system of claim 1 wherein the one or more operating parameters includes a parameter of an electric propulsion motor of the vehicle.

4. The brake actuator control system of claim 3 wherein the parameter is a temperature of the electric propulsion motor.

5. The brake actuator control system of claim 1 wherein the one or more operating parameters includes a mode of operation of the vehicle.

6. The brake actuator control system of claim 1 wherein the one or more operating parameters includes a propulsion torque of the vehicle.

7. The brake actuator control system of claim 1 wherein the one or more operating parameters includes a brake actuator capability.

8. The brake actuator control system of claim 1 wherein the rear bias module is configured to set the rear bias based on 100 minus the front bias.

9. The brake actuator control system of claim 1 wherein the control module is configured to:
   apply power to first electric motors of the front ones of the brake actuators based on the front braking request; and
   apply power to second electric motors of the rear ones of the brake actuators based on the rear braking request.

10. The brake actuator control system of claim 1 wherein the distribution module is configured to determine the front percent using one of a lookup table and an equation that relates front static masses to front percents.

11. The brake actuator control system of claim 1 further comprising a static mass module configured to determine the front static mass based on the braking request.

12. The brake actuator control system of claim 11 wherein the static mass module is configured to determine the front static mass further based on a vehicle loading parameter.

13. The brake actuator control system of claim 12 wherein the vehicle loading parameter is an indicator of whether the vehicle is towing a trailer.

14. The brake actuator control system of claim 12 wherein the vehicle loading parameter is a present load of the vehicle.

15. The brake actuator control system of claim 12 wherein the vehicle loading parameter is a mass distribution of the vehicle.

16. The brake actuator control system of claim 12 wherein the static mass module is configured to determine the front static mass using one of a lookup table and an equation that relates vehicle loading parameters and braking requests to front static masses.

17. The brake actuator control system of claim 1 wherein the control module is configured to set the front braking request based on the braking request multiplied by the front bias.

18. The brake actuator control system of claim 17 wherein the control module is configured to set the rear braking request based on the braking request multiplied by the rear bias.

19. A brake actuator control method for a vehicle, comprising:
   determining a braking request for brake actuators of the vehicle,
   the brake actuators configured to, independently of each other, slow rotation of wheels, respectively, of the vehicle;
   based on one or more operating parameters, determining a front bias for front ones of the brake actuators associated with front ones of wheels, respectively;
   determining a rear bias for rear ones of the brake actuators associated with rear ones of wheels, respectively;

based on the braking request and the front bias, determining a front braking request for the front ones of the brake actuators;

actuating the front ones of the brake actuators based on the front braking request;

based on the braking request and the rear bias, determining a rear braking request for the rear ones of the brake actuators;

actuating the rear ones of the brake actuators based on the rear braking request; and determining a front percent based on a front static mass of the vehicle, wherein determining the front bias includes determining the front bias based on the front static mass and the one or more operating parameters.

20. The brake actuator control method of claim 19 wherein the one or more operating parameters includes a brake rotor temperature.

* * * * *